United States Patent [19]
Seki et al.

[11] Patent Number: 4,905,158
[45] Date of Patent: Feb. 27, 1990

[54] NORMAL VECTOR COMPUTATION METHOD

[75] Inventors: Masaki Seki; Kouji Samukawa, both of Tokyo, Japan

[73] Assignee: Fanuc Ltd., Minamitsuru, Japan

[21] Appl. No.: 159,584

[22] PCT Filed: May 12, 1987

[86] PCT No.: PCT/JP87/00296
§ 371 Date: Jan. 11, 1988
§ 102(e) Date: Jan. 11, 1988

[87] PCT Pub. No.: WO87/07047
PCT Pub. Date: Nov. 19, 1987

[30] Foreign Application Priority Data
May 13, 1986 [JP] Japan .................. 61-109185

[51] Int. Cl.⁴ .................. G06F 15/46; G05B 19/18
[52] U.S. Cl. .................. 364/474.29; 318/572; 364/474.18; 364/474.35; 364/191
[58] Field of Search .................. 364/474.18, 474.29, 364/474.35, 191–193; 318/572

[56] References Cited
U.S. PATENT DOCUMENTS

| | | | |
|---|---|---|---|
| 4,445,182 | 4/1984 | Morita et al. | 364/474.18 X |
| 4,503,493 | 3/1985 | Burkhardt et al. | 364/474.18 X |
| 4,559,601 | 12/1985 | Kishi et al. | 364/474.18 X |
| 4,564,914 | 1/1986 | Ballough et al. | 364/474.18 X |
| 4,659,265 | 4/1987 | Kishi et al. | 364/474.18 X |
| 4,700,314 | 10/1987 | Kinoshita | 364/474.29 X |
| 4,755,927 | 7/1988 | Kishi et al. | 364/474.29 X |

Primary Examiner—Joseph Ruggiero
Attorney, Agent, or Firm—Staas & Halsey

[57] ABSTRACT

The method of the invention includes obtaining points discretely on a three-dimensional curved surface, by using data specifying the three-dimensional curved surface (CSF), in such a manner that the points line up in both a first direction (BC direction) and second direction (DC direction), obtaining the center ($P_c$) of a circular arc passing through three consecutive points ($P_{i,j-1}$, $P_{i,j}$, $P_{i,j+1}$) in e.g. the first direction, and computing a normal vector by adopting a direction from the center of the circular arc to the middle point ($P_{i,j}$) among the aforementioned three points as the normal line direction of the three-dimensional surface at the middle point.

5 Claims, 6 Drawing Sheets

NORMAL VECTOR COMPUTATION METHOD

BACKGROUND OF THE INVENTION

1. Field of the Invention

This invention relates to a normal vector computation method and, more particularly, to a normal vector computation method well-suited for application when computing a tool offset path on a three-dimensional curved surface.

2. Description of Related Art

A curved surface CSF (see FIG. 7) on a design drawing of a three-dimensional mold or the like generally is expressed by a plurality of section curves (e.g. basic curves BC11 BC12 and drive curves DC11, DC12). Shape data indicative of the shape between a certain section curve and the next section curve (e.g. between the basic curves or the drive curves) do not exist. When numerically controlled machining is performed, however, it is required that machining be carried out in such a manner that a smooth connection can be made between the aforementioned section curves even if the intermediate shape is not given. To this end, an automatic programming method has been put into practical use in which points $P_{i,j}$ (the black dots) on a curved surface CSF surrounded by the aforementioned section curves are discretely obtained, the curved surface is expressed as a set of the discretely obtained points, and an NC tape is automatically created to control the nose of a tool to successively traverse these points.

The path of the tool center is a path offset a prescribed amount in a prescribed direction from a path (a cutting path) on the curved surface. For example, in the case of a ball end mill, as shown in FIG. 8, a path TP of the tool center is decided in such a manner that the direction of a line connecting a cutting point $P_{i,j}$ on the curved surface CSF and the tool center $P_T$ assumes the direction of a normal line at the cutting point. NC data are created in such a manner that the tool center $P_T$ traverses the path TP. In the case of a flat end mill, contoured cutting tool or the like, the direction of a line connecting the tool center and the cutting point is not the direction of the normal line, but the normal vector at the cutting point is required in order to obtain the tool center paths of these tools.

To this end, the approach in the prior art is, as shown in FIG. 9, to compute a normal vector V at the cutting point using a total of five points, namely three points $P_{i,j-1}$, $P_{i,j}$, $P_{i,j+1}$ along a first direction (the BC direction) with the cutting point $P_{i,j}$ as the middle point, and three points $P_{i-1,j}$, $P_{i,j}$, $P_{i+1,j}$ along a second direction (the DC direction) with the cutting point $P_{i,j}$ as the middle point. More specifically, the conventional approach includes obtaining an approximate tangent vector $V_{BC}$ in the first direction at the cutting point $P_{i,j}$ in accordance with the following equation:

$$\vec{V}_{BC} = \vec{P}_{i,j+1} - \vec{P}_{i,j-1} \quad (1)$$

obtaining an approximate tangent vector $V_{DC}$ in the second direction at the cutting point $P_{i,j}$ in accordance with the following equation:

$$\vec{V}_{DC} = \vec{P}_{i+1,j} - \vec{P}_{i-1,j} \quad (2)$$

and calculating a normal vector $\vec{V}$ the cutting point $P_{i,j}$ in accordance with the following equation:

$$\vec{V} = \vec{V}_{BC} \times \vec{V}_{DC} \quad (3)$$

However, since this conventional method of calculating the normal vector at the cutting point uses the coordinates of a total of five points, it takes time to obtain the normal vector at each cutting point and, as a result, a considerable period of time is required until NC data are obtained.

SUMMARY OF THE INVENTION

Accordingly, an object of the present invention is to provide a normal vector computing method for computing a normal vector at a cutting point using the coordinates of a small number of points.

The method of the invention includes obtaining points discretely on a three-dimensional curved surface, by using data specifying the three-dimensional curved surface, in such a manner that the points line up in both first and second directions, obtaining the center of a circular arc passing through three consecutive points in the first or second direction, and computing a normal vector by adopting a direction from the center of the circular arc to the middle point among the aforementioned three points as the normal line direction of the three-dimensional surface at the middle point.

DESCRIPTION OF THE PREFERRED EMBODIMENTS

Figure 1:
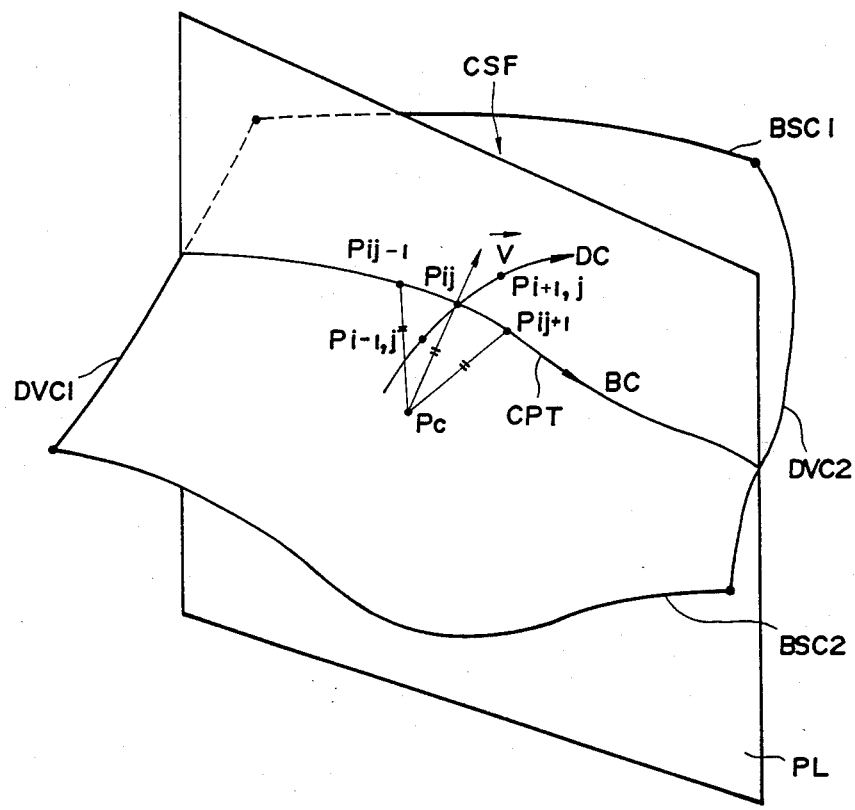
FIG. 1 is a view for describing the invention in general terms.

FIG. 1 is a view for describing the invention in general terms.

In FIG. 1, CSF represents a three-dimensional curved surface, $P_{i,j-1}$, $P_{i,j}$, $P_{i,j+1}$ denote three consecutive cutting points on the curved surface in a first direction (BC direction), $P_{i-1,j}$, $P_{i,j}$, $P_{i+1,j}$ denote three consecutive cutting points on the curved surface in a second direction (DC direction), PL denotes a plane specified by the abovementioned three points $P_{i,j-1}$, $P_{i,j}$, $P_{i,j+1}$, $P_c$ represents the center of a circular arc on the plane PL passing through the abovementioned three points, $\vec{V}$ denotes a normal vector of the curved surface CSF at the cutting point $P_{i,j}$, and CPT represents a blade edge path connecting the cutting points on the curved surface.

Data specifying the three-dimensional curved surface CSF and data specifying the method of computing the normal vector are inputted.

Specifically, an input is made as to whether the normal vector $\vec{V}$ at the cutting point is computed using three consecutive points ($P_{i,j-1}$, $P_{i,j}$, $P_{i,j+1}$) in a first direction (BC direction) with the cutting point $P_{i,j}$ as the midpoint, or the normal vector is computed using three consecutive points ($P_{i-1,j}$, $P_{i,j}$, $P_{i+1,j}$) in a second direction (DC direction) with the cutting point $P_{i,j}$ as the midpoint, or the normal vector is computed using a total of five points, namely three points in the first direction (BC direction) and three points in the second direction (DC directon) with the cutting point $P_{i,j}$ as the midpoint in each direction, as in the prior art.

When points $P_{i,j}$ ($i=1, 2, \ldots, j=1, 2, \ldots$) on a three-dimensional curved surface are discretely obtained so as to line up in both the first direction (BC direction) and second direction (DC direction) using the data specifying the curved surface, and the normal vector $\vec{V}$ of the three-dimensional curved surface CSF at the point $P_{i,j}$ is computed, the method of computing the normal vector is checked and, if the normal vector is to be computed using the three consecutive points ($P_{i,j-1}$, $P_{i,j}$, $P_{i,j+1}$) in the first direction (BC direction) with the aforementioned point as the midpoint, the center $P_c$ of the circular arc passing through these three points is obtained, and the normal vector is computed by adopting the direction from the center of this circular arc to the point $P_{i,j}$ as the normal line direction.

Figure 2:
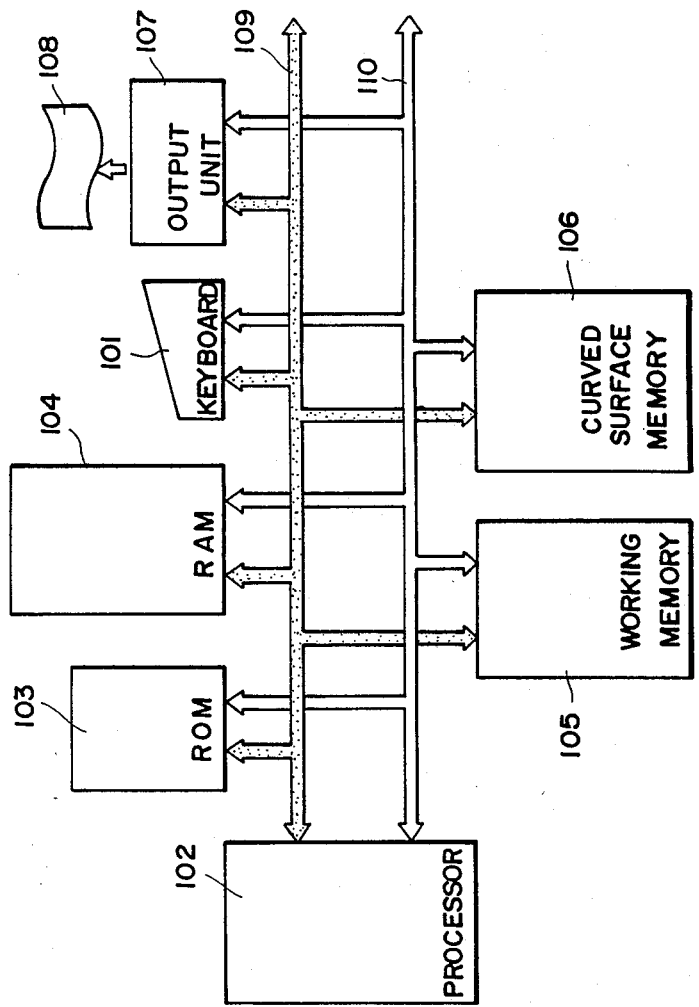
FIG. 2 is a block diagram of an apparatus for practicing the invention.

FIG. 2 is a block diagram of an automatic programming apparatus for practicing the method of the present invention. In the FIGURE, numeral 101 denotes a keyboard for data input, 102 a processor, 103 a ROM storing a control program, 104 a RAM, 105 a working memory, 106 a curved surface memory for storing curved surface data of a generated complex curved surface and NC program data for curved surface machining, 107 an output unit for outputting the curved surface data of the generated complex curved surface or the NC program data for curved surface machining to an external storage medium 108 such as a paper tape or magnetic tape, 109 an address bus, and 110 a data bus.

Figure 3:
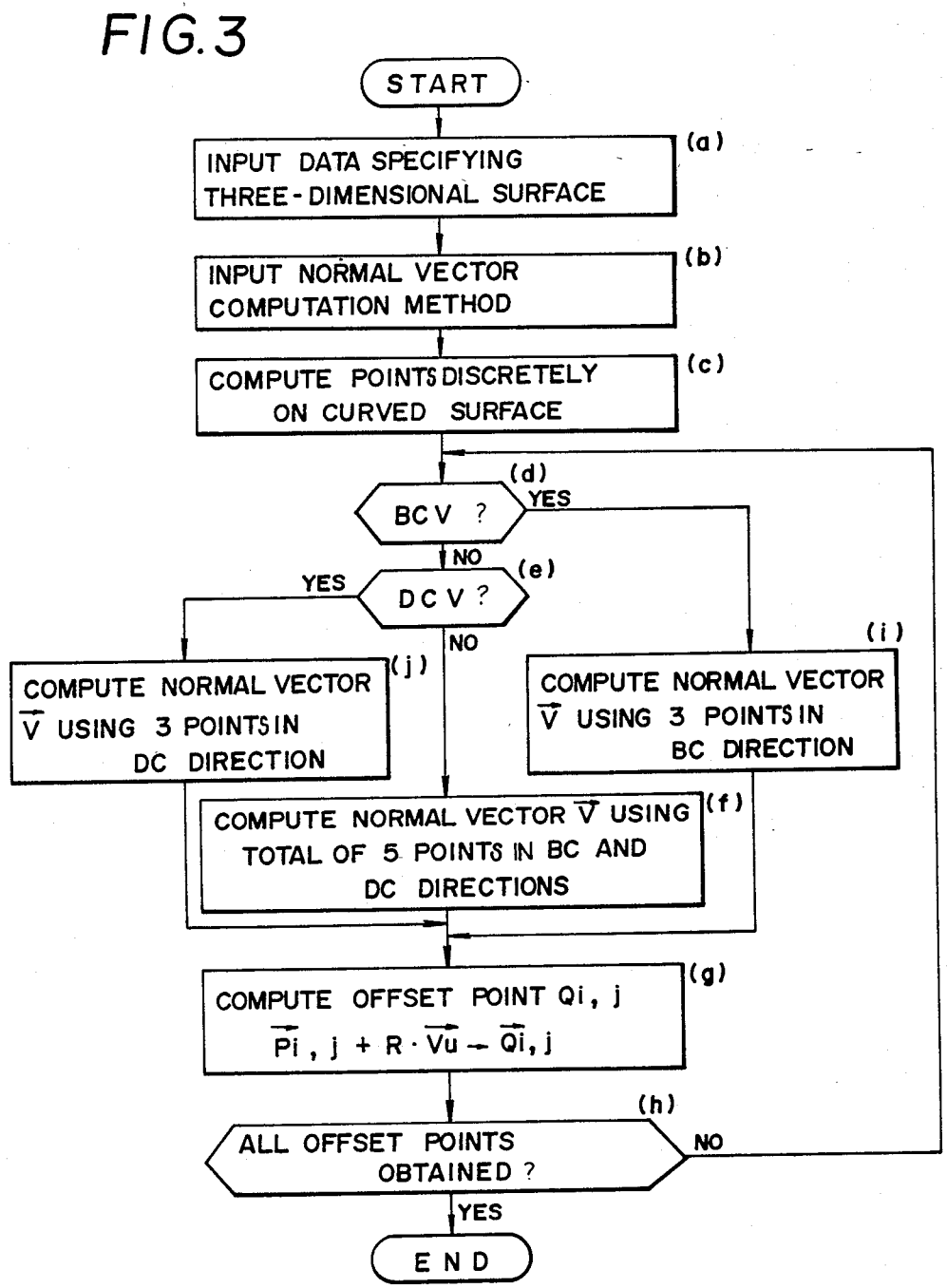
FIG. 3 is a flowchart of processing indicating the method of the invention.
Figure 4:
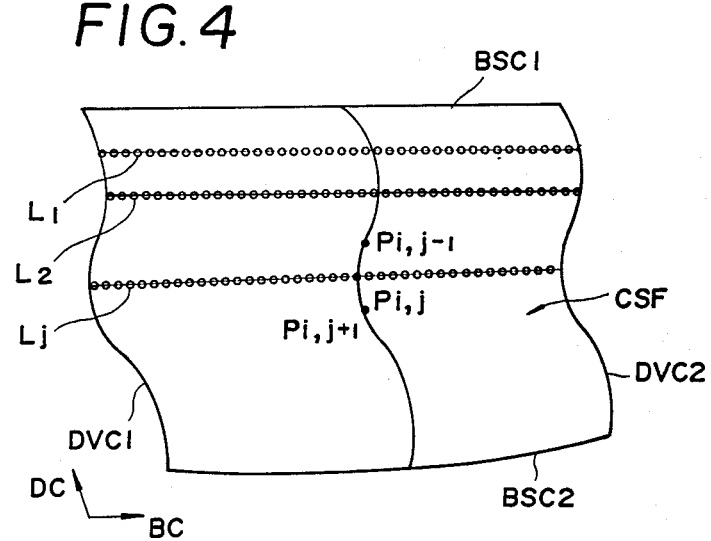
FIGS. 4 and 5 are views for describing a shape to which the present invention can be applied.

A method of creating NC data for a complex curved surface in accordance with the present invention will now be described in accordance with the flowchart of FIG. 3.

(a) First, data (inclusive of basic curves BSC1, BSC2 and drive curves DVC1, DVC2) specifying the three-dimensional curved surface CSF (see FIG. 1) are inputted from the keyboard 101 and stored in the RAM 104 or working memory 105.

(b) Next, data specifying the method of computing the normal vector are inputted. For example, an input is made as to whether:

(i) the normal vector is computed using three consecutive points in the first direction (BC direction);

(ii) the normal vector is computed using three consecutive points in the second direction (DC direction); or (iii) the normal vector is computed using a total of five points, namely three points in the first direction (BC direction) and three points in the second direction (DC direction) (the total number of points is five since the midpoints in each direction coincide), as in the prior art.

"BCV" is inputted in case (i), "DCV" in case (ii), and no input is made in case (iii).

Figure 5:
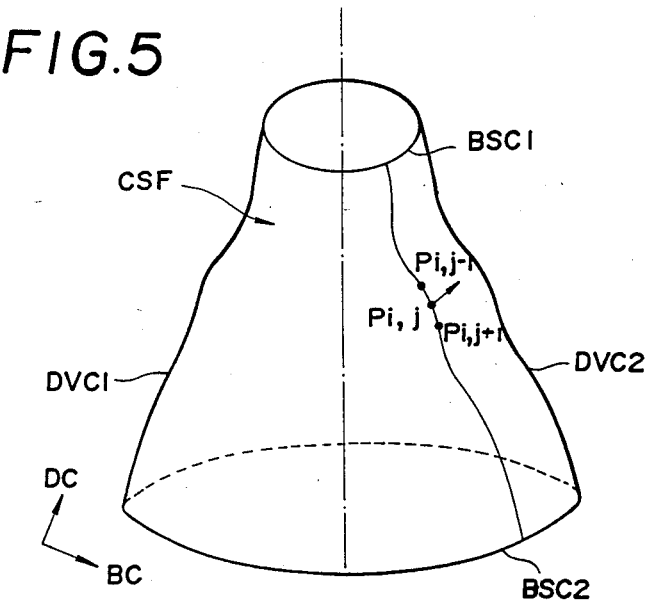

The operator decides whether the normal vector is to be computed by method (i), (ii) or (iii) upon referring to the design drawing. For example, if the drive curve DVC1 and drive curve DVC2 are subtantially the same in shape and, moreover, the heights (coordinates in the Z direction) of points on each straight line $L_j$ in the first direction (BC direction) are substantially equal, then it is decided to compute the normal vector using three points in the second direction (DC direction). In the case of a rotary body such as shown in FIG. 5, it is decided to compute the normal vector using three points in the second direction. If it is thus decided to compute the normal vector using three points, the normal vector can be computed simply, accurately and in a short period of time.

Figure 6:
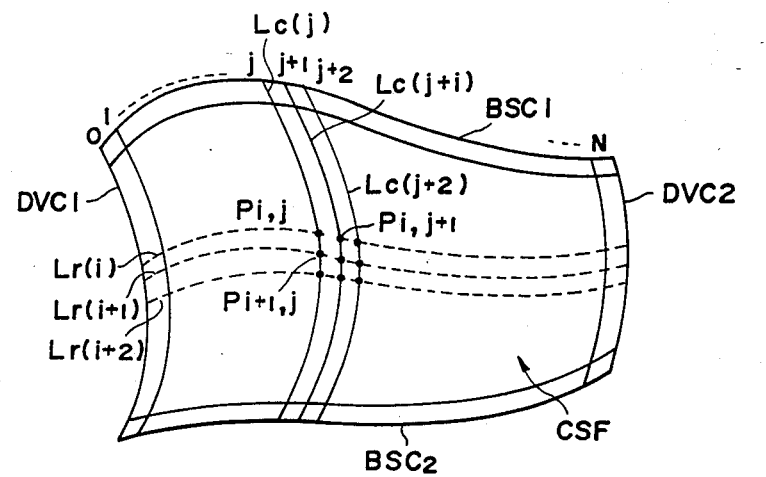
FIG. 6 is a view for describing a curved surface.
Figure 7:
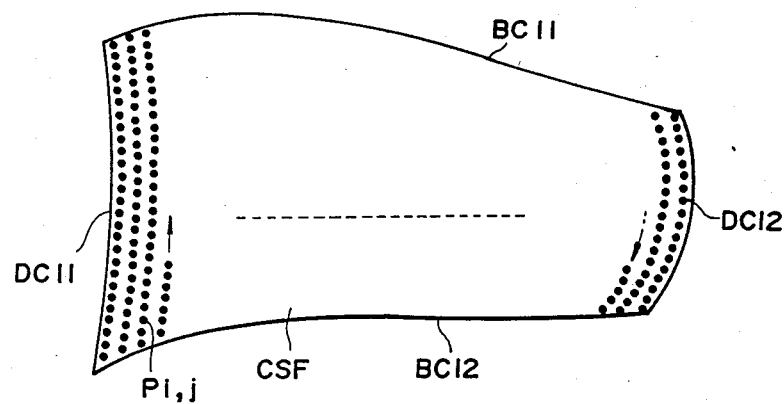
FIGS. 7 through 9 are views for describing a conventional method.
Figure 8:
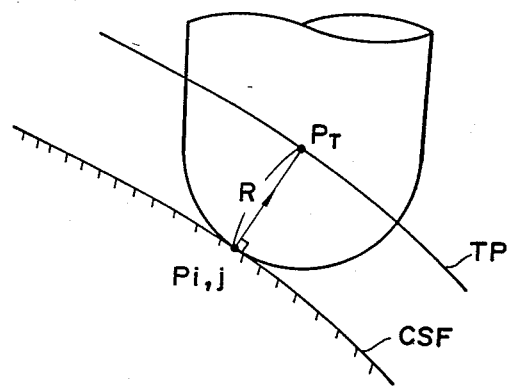
Figure 9:
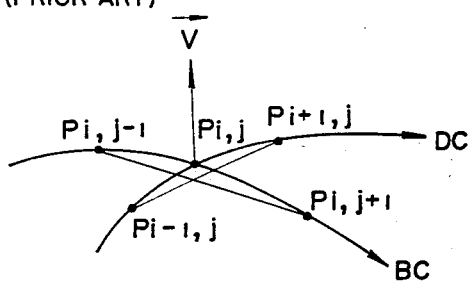

(c) When the entry of the prescribed data ends, points $P_{i,j}$ ($i=1, 2, \ldots; j=1, 2, \ldots$) on the curved surface CSF (see FIG. 6) are obtained by a well-known method so as to line up discretely in both the first and second directions (BC direction and DC direction).

If an intermediate section curve containing a j-th dividing point on the basic curve BSC1 of the curved surface is expressed by $L_c(j)$ and a curve obtained by connecting an i-th dividing point on each of intermediate section curves $L_c(j)$ ($j=1, 2, 3, \ldots n$) is expressed by $L_r(i)$, then the point $P_{i,j}$ will be the point of intersection between the curves $L_c(j)$ and $L_r(i)$. Let the first direction be the direction of the curve $L_r(i)$, and let the second direction be the direction of the curve $L_c(j)$.

(d) When points on the three-dimensional curved surface CSF have been found, the method to be used for normal vector computation is checked when the normal vector $\vec{V}$ of the three-dimensional curved surface at the point $P_{i,j}$ is computed. In other words, it is checked whether "BCV" has been inputted as the data specifying the computtion method.

(e) If "BCV" has not been inputted, it is checked whether "DCV" has been inputted as data specifying the normal vector computation method.

(f) If "DCV" has not been inputted, then a unit normal vector $\vec{V}_u$ is computed using the coordinates of a total of five points in the first and second directions, as in the prior-art method.

(g) Next, a position vector $\vec{Q}_{i,j}$ of an offset point $Q_{i,j}$ on the path of a tool center is computed in accordance with the following equation:

$$\vec{P}_{i,j} + R \cdot \vec{V}_u \rightarrow \vec{Q}_{i,j} \tag{4}$$

using a position vector $\vec{P}_{i,j}$ at the cutting point $P_{i,j}$, the unit vector $\vec{V}_u$ and tool radius R (in the case of a ball end mill).

(h) A check is then performed to determine whether the offset points of all points on the curved surface have been found. If they have been found, processing is ended; if not, processing is repeated from step (d) onward.

(i) If "BCV" is inputted at step (d) as the data specifying the normal vector computation method, the normal vector is computed using the three consecutive points $P_{i,j-1}$, $P_{i,j}$, $P_{i,j+1}$ (see FIG. 1) in the first direction (basic curve direction), with the point $P_{i,j}$ as the midpoint. That is, first the center $P_c$ of the circular arc on the plane PL passing through these three points is found, then the normal vector $\vec{V}$, namely the normal vector obtained by adopting the direction from the center $P_c$ of the circular arc to the point $P_{i,j}$ as the normal line direction, is calculated in accordance with the following equation:

$$\vec{P}_{i,j} - \vec{P}_c \rightarrow \vec{V} \tag{5}$$

and processing from step (g) onward is repeated thereafter.

(j) If "DCV" is inputted at step (e) as the data specifying the normal vector computation method, the normal vector is computed through a method similar to that of step (i) using the three consecutive points $P_{i-1,j}$, $P_{i,j}$, $P_{i+1,j}$ in the second direction (drive curve direction), with the point $P_{i,j}$ as the midpoint. Processing from step (g) onward is repeated thereafter.

In accordance with the present invention, the arrangement is such that data specifying a three-dimensional curve and data specifying a normal vector computation method are inputted and, if the normal vector is to be computed using three consecutive points in a first or second direction, the center of a circular arc passing through these three points is obtained and the normal vector is computed by adopting the direction from the center of the circular arc to the middle point as the normal line direction of the curved surface at the middle point. This makes it possible to compute a normal vector at a cutting point using the coordinates of a fewer number of points, and enables the normal vector to be computed simply in a short period of time and with sufficient accuracy.

What is claimed is:

1. A normal vector computation method comprising the steps of:
   (a) inputting data specifying a three-dimensional curved surface, a tool radius length and a normal vector computation method;
   (b) obtaining points discretely on the three-dimensional curved surface, each of the points aligned in first and second directions with other points, by using the data specifying the three-dimensional curved surface;
   (c) computing, if the normal vector is to be computed by using three consecutive points in one of the first and second directions, the center of a circular arc passing through the three consecutive points;
   (d) computing the normal vector by adopting a direction from the center of the circular arc to a middle point, defined by a position vector, among the three consecutive points as a normal line direction of the three-dimensional curved surface at the middle point;
   (e) computing a position vector of an offset point separated from the middle point by the tool radius length in dependence upon the position vector of the middle point and the normal vector; and
   (f) producing a machining program for machining a complex curved surface in dependance upon the position vector of the offset point computed in step (e) for the points obtained in step (b).

2. A normal vector computation method according to claim 1, wherein said inputting in step (a) of the data specifying the three-dimensional curved surface includes inputting curve data defining four section curves for specifying an external form of the three-dimensional curved surface.

3. A normal vector computation method according to claim 2, wherein the four section curves specified in step (a) include two mutually opposing basic curves aligned in the first direction and two mutually opposing drives curves aligned in the second direction.

4. A normal vector computation method according to claim 3, wherein the normal vector computation method specified by the data input in step (a) is one of a first method of computing the normal vector by using three consecutive points in the first direction, a second method of computing the normal vector by using three consecutive points in the second direction, and a third method of computing the normal vector by using three consecutive points in the first direction and three consecutive points in the second direction.

5. A normal vector computation method comprising the steps of:
   (a) inputting data specifying a three-dimensional curved surface, a tool radius length and a normal vector computation method;
   (b) obtaining points discretely on the three-dimensional curved surface, each of the points aligned in first and second directions with other points, by using the data specifying the three-dimensional curved surface;
   (c) computing, if the normal vector is to be computed by using three consecutive points in one of the first and second directions, the center of a circular arc passing through the three consecutive points;
   (d) computing the normal vector by adopting a direction from the center of the circular arc to a middle point, having a position vector, among the three consecutive points as a normal line direction of the three-dimensional curved surface at the middle point;
   (e) computing a position vector of an offset point separated from the middle point by the tool radius length in dependence upon the position vector of the middle point and the normal vector; and
   (f) machining a workpiece to produce the three-dimensional curved surface thereon is dependence upon the position vector of the offset point computed in step (e) for the points obtained in step (b).

* * * * *